United States Patent
Fan et al.

(10) Patent No.: US 11,988,861 B1
(45) Date of Patent: May 21, 2024

(54) DIFFRACTIVE OPTICAL WAVEGUIDE AND DISPLAY DEVICE

(71) Applicant: Jiaxing UPhoton Optoelectronics Technology Co., Ltd., Jiaxing (CN)

(72) Inventors: Zhentao Fan, Jiaxing (CN); Xingming Zhao, Jiaxing (CN); Kehan Tian, Jiaxing (CN)

(73) Assignee: Jiaxing Uphoton Optoelectronics Technology Co. Ltd., Jiaxing (CN)

( * ) Notice: Subject to any disclaimer, the term of this patent is extended or adjusted under 35 U.S.C. 154(b) by 0 days.

(21) Appl. No.: 18/403,882

(22) Filed: Jan. 4, 2024

(30) Foreign Application Priority Data

Jan. 9, 2023 (CN) .......................... 202310026740.1

(51) Int. Cl.
*F21V 8/00* (2006.01)
*G02B 27/00* (2006.01)
*G02B 27/01* (2006.01)

(52) U.S. Cl.
CPC ......... *G02B 6/0016* (2013.01); *G02B 6/0036* (2013.01); *G02B 27/0081* (2013.01); *G02B 27/0172* (2013.01)

(58) Field of Classification Search
None
See application file for complete search history.

(56) References Cited

U.S. PATENT DOCUMENTS 8,320,032 B2 * 11/2012 Levola ............... G02B 27/0081
359/13
10,545,346 B2 * 1/2020 Waldern ................ G06F 3/0433
10,935,730 B1 * 3/2021 Lou ..................... G02B 27/0172
(Continued)

FOREIGN PATENT DOCUMENTS

| CN | 111373297 A | 7/2020 |
| CN | 211236331 U | 8/2020 |

(Continued)

OTHER PUBLICATIONS

English translation of First Chinese Office Action for priority Chinese Patent Application No. 202310026740.1 dated Mar. 16, 2023.

(Continued)

*Primary Examiner* — Jerry Rahll
(74) *Attorney, Agent, or Firm* — Renner, Kenner, Greive, Bobak, Taylor & Weber Co., LPA

(57) ABSTRACT

A diffractive optical waveguide for optical pupil expansion and a display device are provided. The diffractive optical waveguide comprises a waveguide substrate and a grating structure. The grating structure is disposed on a surface of the waveguide substrate or in the waveguide substrate and comprises a plurality of periodic structures arranged at intervals along a first direction and arranged at intervals along a second direction. The second direction is different from the first direction. A first distance between the centers of adjacent periodic structures in the first direction is smaller than a second distance between the centers of adjacent periodic structures in the second direction. The grating structure is equivalent to a one-dimensional grating with a grating vector in a vertical direction of the first direction, and the vertical direction is parallel to a plane where the grating structure is located.

19 Claims, 9 Drawing Sheets

(56) References Cited

U.S. PATENT DOCUMENTS

| | | | |
|---|---|---|---|
| 10,962,787 B1* | 3/2021 | Lou | G02B 6/0036 |
| 11,231,579 B1* | 1/2022 | Calafiore | G02B 27/1086 |
| 2009/0303599 A1* | 12/2009 | Levola | G02B 27/0081 |
| | | | 359/569 |
| 2010/0214659 A1* | 8/2010 | Levola | G02B 6/0035 |
| | | | 359/566 |
| 2018/0188542 A1* | 7/2018 | Waldern | G02B 27/0093 |
| 2020/0264367 A1* | 8/2020 | Huang | G02B 27/0081 |
| 2022/0155511 A1* | 5/2022 | Park | G02B 27/0081 |
| 2023/0008461 A1* | 1/2023 | Ha | G02B 27/0081 |

FOREIGN PATENT DOCUMENTS

| | | |
|---|---|---|
| CN | 113156581 A | 7/2021 |
| CN | 214474235 U | 10/2021 |
| CN | 214623106 U | 11/2021 |
| CN | 114137649 A | 3/2022 |
| CN | 115016057 A | 9/2022 |
| WO | 2022115580 A1 | 6/2022 |

OTHER PUBLICATIONS

First Chinese Office Action for priority Chinese Patent Application No. 202310026740.1 dated Mar. 16, 2023 (in Chinese).

English translation of Response to First Chinese Office Action for priority Chinese Patent Application No. 202310026740.1 filed on Mar. 21, 2023.

Response to First Chinese Office Action for priority Chinese Patent Application No. 202310026740.1 filed on Mar. 21, 2023 (in Chinese).

English translation of Notice of Grant of Patent Right for Invention for priority Chinese Patent Application No. 202310026740.1 dated Mar. 26, 2023.

Notice of Grant of Patent Right for Invention for priority Chinese Patent Application No. 202310026740.1 dated Mar. 26, 2023 (in Chinese).

* cited by examiner

DIFFRACTIVE OPTICAL WAVEGUIDE AND DISPLAY DEVICE

CROSS-REFERENCE TO RELATED APPLICATION

The present application claims priority to Chinese Patent Application No. 2023100267401, filed on Jan. 9, 2023, which is hereby incorporated by reference in its entirety.

BACKGROUND

The present application generally relates to the technical field of diffractive optics, and more particularly to a diffractive optical waveguide and a display device.

With the high development of semiconductor technology, the way of interaction between human and computer is developing rapidly, wherein Augmented Reality (AR) display, can provide more dimensional information to human beings and has been widely concerned. AR glasses are one of the important mediums in the field of augmented reality display. The diffractive optical waveguide has the advantages of allowing production with high ability for mass production and a light, thin form, and is gradually approved in the field of AR display, being expected to become the mainstream technology development direction of AR field in the future. The grating structure is one of the essential components of the diffractive optical waveguide.

In order to improve the diffraction efficiency and uniformity of the waveguide, the coupling-out region of the waveguide is generally divided in regions, and one-dimensional gratings are provided in some regions. For example, the one-dimensional gratings are used in the regions on both sides of the two-dimensional coupling-out grating to improve unilateral splitting efficiency and coupling-out efficiency. The commonly used one-dimensional grating is usually the most common rectangular grating, and the line width of the rectangular grating is also limited by the process ability, which cannot be processed very fine by typical process. Moreover, the rectangular grating has only two parameter degrees of freedom, i.e., depth and width, so the rectangular grating is limited in the capability of adjusting the efficiency.

Therefore, it is necessary to improve the diffractive optical waveguide to solve at least one technical problem.

SUMMARY

The present application is proposed to solve at least one of the above-mentioned problems. Specifically, a first aspect of the present application provides a diffractive optical waveguide for optical pupil expansion, comprising a waveguide substrate and a grating structure disposed on a surface of the waveguide substrate or in the waveguide substrate. The grating structure comprises a plurality of periodic structures arranged at intervals along a first direction and arranged at intervals along a second direction. Wherein the second direction is different from the first direction. A first distance between the centers of adjacent periodic structures in the first direction is smaller than a second distance between the centers of adjacent periodic structures in the second direction. The grating structure is equivalent to a one-dimensional grating with a grating vector in a vertical direction of the first direction, and the vertical direction is parallel to a plane where the grating structure is located.

In one embodiment, the first distance is smaller than a projection distance of the second distance in a third direction perpendicular to the first direction, and the third direction is parallel to the plane where the grating structure is located.

In one embodiment, the first distance is P, and P also satisfies the following relational expression:

$$P < \frac{\lambda}{\max\left(|n_I\sin\theta\cos\varphi| + \sqrt{n_I^2 - \left[(n_I\sin\theta\cos\varphi)\tan\varepsilon - \left(n_I\sin\theta\sin\varphi\sec\varepsilon + n\frac{\lambda}{D}\right)\right]^2}\right)}$$

wherein, $\varepsilon$ is an included angle between the third direction and the second direction, $\lambda$ is a wavelength of incident light, $(\theta,\varphi)$ are an incidence angle and azimuth angle of light beam incident onto the grating structure through total reflection propagation in the waveguide substrate, $n_I$ is a waveguide refractive index, and D is the projection distance.

In one embodiment, the first distance is less than 0.5 times the projection distance.

In one embodiment, the first distance is less than 0.4 times the projection distance.

In one embodiment, the projection distance has a numerical range between 200 and 700 nm.

In one embodiment, the periodic structure has a size greater than or equal to 70 nm in the first direction.

In one embodiment, the periodic structure is a hole-like structure or a columnar structure.

In one embodiment, a cross-sectional shape of the periodic structure is one of the following shapes: circle, oval, and polygon.

In one embodiment, the polygon comprises a polygon with chamfers or a polygon without chamfers.

In one embodiment, the waveguide substrate comprises a coupling-in region and a coupling-out region comprising a first coupling-out region, a second coupling-out region, and a third coupling-out region. The second coupling-out region is disposed between the first coupling-out region and the third coupling-out region. The diffractive optical waveguide further comprises a coupling-in grating and a coupling-out grating. The coupling-in grating is disposed on a surface of the waveguide substrate or in the waveguide substrate and is located in the coupling-in region, and is configured to couple input light into the waveguide substrate to cause it to propagate within the waveguide substrate through total reflection. The coupling-out grating is disposed on a surface of the waveguide substrate or in the waveguide substrate and is located in the coupling-out region for coupling at least a portion of input light propagating therein out of the waveguide substrate by diffraction. Wherein the coupling-out grating comprises the grating structure provided in at least a part region of at least one selected from the first coupling-out region and the third coupling-out region and being close to the coupling-in grating, and a first coupling-out grating disposed in the second coupling-out region, wherein the first coupling-out grating is a two-dimensional grating.

In one embodiment, the first coupling-out region comprises a first sub-coupling-out region and a second sub-coupling-out region, wherein the first sub-coupling-out region is close to the coupling-in grating; the second sub-coupling-out region is far away from the coupling-in grating; the grating structure is located in the first sub-coupling-out region; and the second sub-coupling-out region is provided with a one-dimensional grating.

In one embodiment, the third coupling-out region comprises a third sub-coupling-out region and a fourth sub-coupling-out region, wherein the third sub-coupling-out region is close to the coupling-in grating; the fourth sub-coupling-out region is far away from the coupling-in grating; the grating structure is located in the third sub-coupling-out region; and the fourth sub-coupling-out region is provided with a one-dimensional grating.

In one embodiment, the first coupling-out region and the third coupling-out region are symmetrical about a center line of the second coupling-out region.

In one embodiment, the waveguide substrate comprises a coupling-in region, a relay region and a coupling-out region. A coupling-in grating is disposed on a surface of the waveguide substrate or in the waveguide substrate and is located in the coupling-in region, and is configured to couple input light into the waveguide substrate to cause it to propagate within the waveguide substrate through total reflection. A relay grating is disposed on a surface of the waveguide substrate or in the waveguide substrate and is located in the relay region for splitting at least a portion of input light propagating therein to the coupling-out grating by diffraction, wherein the relay grating comprises the grating structure. A coupling-out grating is disposed on a surface of the waveguide substrate or in the waveguide substrate and is located in the coupling-out region for coupling at least a portion of input light propagating therein out of the waveguide substrate by diffraction.

In one embodiment, the relay region comprises a first sub-relay region and a second sub-relay region, wherein the grating structure is disposed in the first sub-relay region that is close to the coupling-in grating, and the second sub-relay region is provided with a one-dimensional grating.

In one embodiment, the grating structure has a diffraction order in a third direction perpendicular to the first direction, and the diffraction order in the first direction is an evanescent wave, wherein the third direction is also parallel to the plane where the grating structure is located.

The present application further provides a display device, comprising the aforementioned diffractive optical waveguide, an optical machine and an actuating device configured to actuate the optical machine to project image light onto the coupling-in grating of the diffractive optical waveguide.

In one embodiment, the optical machine is any one of the following optical machines: DLP optical machine, Mems optical machine or MicroLED optical machine.

In one embodiment, the display device is a near-eye display device, comprising a lens including the diffractive optical waveguide and a frame for holding the lens near eyes.

In one embodiment, the display device is an augmented reality display device or a virtual reality display device.

The grating structure of the diffractive optical waveguide of the present application comprises a plurality of periodic structures arranged at intervals along a first direction and arranged at intervals along a second direction. The first distance between the centers of adjacent periodic structures in the first direction is smaller than the second distance between the centers of adjacent periodic structures in the second direction. The grating structure is equivalent to a one-dimensional grating with a grating vector in a vertical direction of the first direction. The grating structure of the present application has a larger second distance in the second direction, so it is easier to process. Moreover, it has more freedom of adjustable parameters and stronger efficiency adjustment ability, and is more conducive to improving the light efficiency of the waveguide. Since the display device of the present application comprises the aforementioned diffractive optical waveguide, it has substantially the same advantages as the diffractive optical waveguide.

BRIEF DESCRIPTION OF THE DRAWINGS

In order to illustrate the technical solutions in the embodiments of the present application more clearly, the following briefly introduces the drawings that need to be used in the description of the embodiments. Apparently, the drawings described in the following are only some embodiments of the present application. For those of ordinary skill in the art, other drawings can also be obtained from these drawings without creative work.

DETAILED DESCRIPTION

Figure 1:
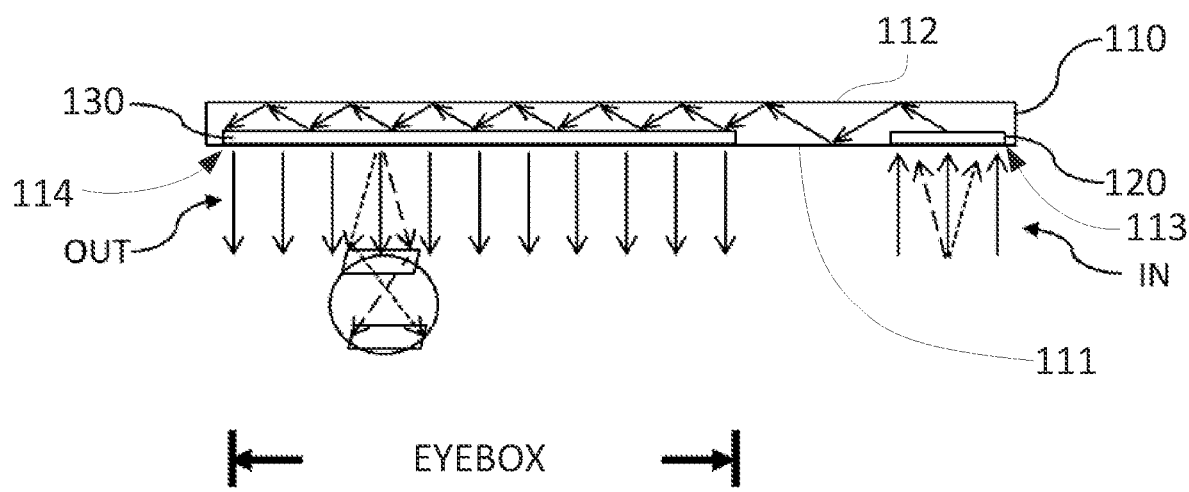
FIG. 1 shows a front view of a diffractive optical waveguide in one embodiment of the present application.

In order to make the objectives, technical solutions and advantages of the present application more apparent, the exemplary embodiments according to the present application will be described in detail below with reference to the accompanying drawings. Apparently, the described embodiments are only a part of the embodiments of the present application, rather than all the embodiments of the present application. It should be understood that the present application is not limited by the example embodiments described herein. Based on the embodiments of the present application described herein, all other embodiments obtained by those skilled in the art without creative work should fall within the protection scope of the present application.

In the following description, numerous specific details are set forth in order to provide a more thorough understanding of the present application. However, it is obvious to those skilled in the art that the present application may be implemented without one or more of these details. In other examples, some technical features well-known in this art are not described in order to avoid confusion with the present application.

It is to be understood that the present application can be implemented in various forms but should not be construed as being limited to the embodiments set forth herein. On the contrary, these embodiments are provided so that this disclosure will be thorough and complete, and the scope of the application will be will fully conveyed to those skilled in the art.

In order to understand the present application thoroughly, detailed structures will be provided in the following description to elucidate the technical solutions presented in the present application. Alternative embodiments of the present application are described in detail as below. However, the present application may also have other embodiments in addition to these detailed descriptions.

In order to solve the aforementioned technical problems, the present application provides a diffractive optical waveguide for optical pupil expansion, comprising a waveguide substrate and a grating structure disposed on a surface of the waveguide substrate or in the waveguide substrate. The grating structure comprises a plurality of periodic structures arranged at intervals along a first direction and arranged at intervals along a second direction. Wherein the second direction is different from the first direction. A first distance between the centers of adjacent periodic structures in the first direction is smaller than a second distance between the centers of adjacent periodic structures in the second direction. The grating structure is equivalent to a one-dimensional grating with a grating vector in a vertical direction of the first direction, and the vertical direction is parallel to a plane where the grating structure is located.

The gating structure of the diffractive optical waveguide of the present application comprises a plurality of periodic structures arranged at intervals along a first direction and arranged at intervals along a second direction. The first distance between the centers of adjacent periodic structures in the first direction is smaller than the second distance between the centers of adjacent periodic structures in the second direction. The grating structure is equivalent to a one-dimensional grating with a grating vector in a vertical direction of the first direction. The grating structure of the present application has a larger second distance in the second direction, so it is easier to process. Moreover, it has more freedom of adjustable parameters and stronger efficiency adjustment ability, and is more conducive to improving the light efficiency of the waveguide.

The diffractive optical waveguide and the display device of the present application will be described below with reference to FIGS. 1 to 8. The features of the various embodiments of the present application may be combined with each other without conflict.

The present application provides a diffractive optical waveguide 100 for optical pupil expansion. Wherein FIG. 1 schematically illustrates an example of the diffractive optical waveguide 100 for optical pupil expansion according to an embodiment of the present invention, namely the diffractive optical waveguide 100. As shown in FIG. 1, the diffractive optical waveguide 100 comprises a waveguide substrate 110. The waveguide substrate 110 may be made of glass, optical plastic, or other optical transmission materials.

Optionally, the waveguide substrate 110 may have first and second substantially flat surfaces 111, 112. Wherein the first surface 111 is opposite to the second surface 112. Wherein the first surface 111 may refer to the surface of the display device with the waveguide substrate 110 on the side facing the viewer's eyes. The waveguide substrate 110 may propagate light in a direction substantially parallel to the first surface 111 and the second surface 112 through total internal reflection.

Optionally, the shape of the waveguide substrate 110 may be any suitable shape, for example, a rectangle, a dumbbell shape, a butterfly shape, or the like. The thickness of the waveguide substrate 110 may be any suitable thickness. For example, the thickness of the waveguide substrate 110 is greater than or equal to 0.4 mm, and is less than or equal to 2 mm. The waveguide substrate 110 in this thickness range may provide good optical properties without being too thick or heavy to affect the user's experience. It is worth mentioning that the thickness of the waveguide substrate 110 may refer to the dimension of the waveguide substrate 110 in a direction substantially perpendicular to the first surface 111 and the second surface 112.

Optionally, the waveguide substrate 110 comprises a coupling-in region 113 and a coupling-out region 114. The diffractive optical waveguide 100 of the present application further comprises a coupling-in grating 120 and a coupling-out grating 130. The coupling-in grating 120 and the coupling-out grating 130 may be located on the same side of the waveguide substrate 110, for example, both of which are disposed on the first surface 111 of the waveguide substrate 110. The coupling-in grating 120 and the coupling-out grating 130 may also be located on different sides, i.e., located on the first surface 111 and the second surface 112, respectively.

Wherein, the coupling-in grating 120 is disposed on or in the waveguide substrate 110 and located in the coupling-in region 113, and is configured to couple input light into the waveguide substrate 110 to cause it to propagate within the waveguide substrate 110 through total reflection, such that the light propagates toward the coupling-out grating.

The coupling-in grating 120 may be a one-dimensional grating, such as a linear grating (also referred to as a straight-tooth grating), or a slanted grating, a non-blazed grating, and other suitable types of gratings. Alternatively, the coupling-in grating 120 may also be a metasurface coupling-in structure. In some examples, the coupling-in grating 120 is a one-dimensional grating, a two-dimensional grating, or is formed by two gratings with different grating vectors joined together. The coupling-in grating 120 may be an optical element including a periodic structure, which may be fabricated by any suitable microfabrication process. For example, the grating may be fabricated on the surface of or inside the waveguide substrate 110 by photolithography. Alternatively, the grating may also be fabricated on the waveguide substrate 110 by nanoimprint lithography, thereby forming a surface relief diffraction grating. Optionally, the period of the coupling-in grating 120 may be 350 nm to 600 nm, or other suitable period lengths.

The coupling-out grating is disposed on or in the waveguide substrate and located in the coupling-out region 114. The coupling-out grating is used to couple at least a portion of the light propagating therein out of the waveguide substrate by diffraction, such that the coupled-out light may be received by the viewer's eyes. When the light entering the coupling-in grating 120 is, for example, image light projected by a projector, the light coupled out from the coupling-out grating 130 is at least a portion of the image light, and the portion of the image light is guided to the viewer's eyes through the coupling-out grating 130 so that the image projected by the projector is visible to the viewer's eyes. Wherein, the coupling-out grating 130 plays the role of pupil expansion. After the coupling-out grating 130 receives a thinner incident light beam from the coupling-in grating, the coupling-out grating continuously diffracts and expands the light beam in two directions in a plane while partially couples the light out of the waveguide substrate for the purpose of optical pupil expansion in the plane, so that the viewer may observe the display information carried by the incident light beam in a larger eyebox (EB).

In some embodiments, the coupling-out grating may be fabricated by any suitable microfabrication process. For example, the grating may be fabricated on the surface of or in (i.e., inside) the waveguide substrate 110 by photolithography. Alternatively, the grating may also be fabricated or on the waveguide substrate 110 by nanoimprint lithography, thereby forming a surface relief diffraction grating. It is worth mentioning that various shapes of gratings illustrated in this application are the shapes of the top surfaces of the gratings parallel to the surface of the optical waveguide (i.e., the surface on which the coupling-out grating or the coupling-in grating 120 is disposed). The shapes may be cross-sectional shapes taken in a plane substantially parallel to the surface of the optical waveguide, or may be projection shapes projected on a plane parallel to the surface of the optical waveguide.

In some embodiments, the waveguide substrate 110 may further comprise a relay region. A relay grating 143 is disposed on the surface of the waveguide substrate or in the waveguide substrate and located in the relay region. The relay grating 143 is used for causing at least a portion of input light (that is, the light from the coupling-in grating) propagating therein to be split to the coupling-out grating by diffraction.

Figure 2:
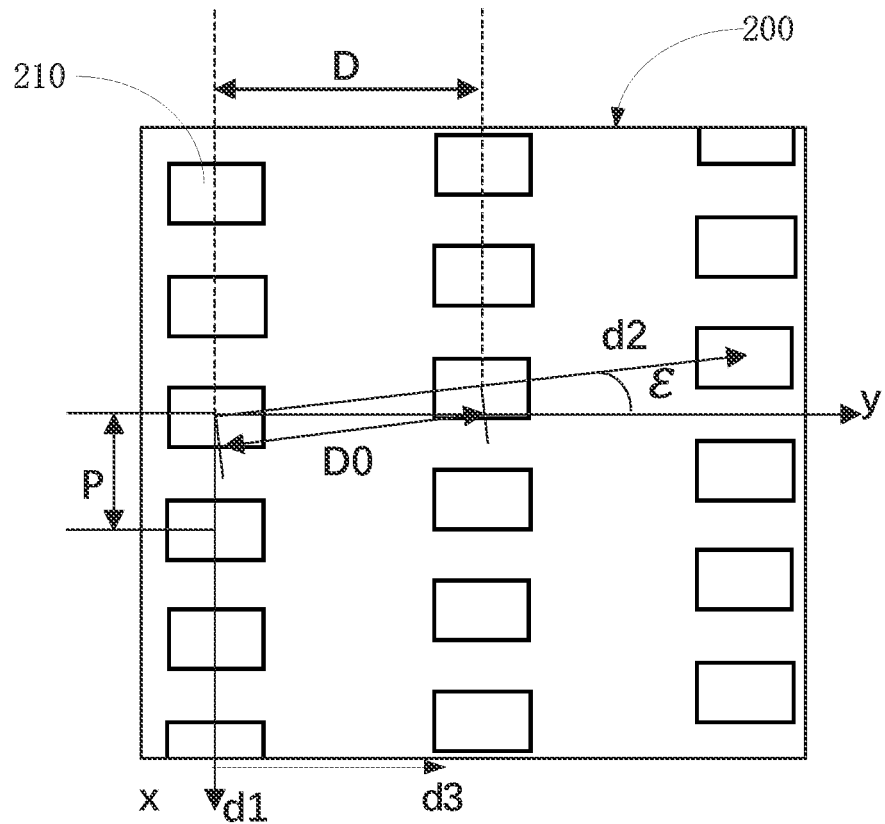
FIG. 2 shows a top view of a grating structure of the diffractive optical waveguide in one embodiment of the present application.

In some embodiments, as shown in FIG. 2, a grating structure 200 is disposed on the surface of the waveguide substrate or in the waveguide substrate. The grating structure 200 comprises a plurality of periodic structures 210, which are arranged at intervals along a first direction d1 and arranged at intervals along a second direction d2. That is, the plurality of periodic structures 210 of the grating structure 200 are arranged in an array pattern.

As shown in FIG. 2, the second direction d2 is different from the first direction d1. A first distance P between the centers of the adjacent periodic structures in the first direction is smaller than a second distance DO between the centers of the adjacent periodic structures in the second direction. By making the first distance P smaller than the second distance DO, the grating structure may be equivalent to a one-dimensional grating with a grating vector in a vertical direction of the first direction, and the vertical direction of the first direction is parallel to the plane where the grating structure is located. Since the second distance of the grating structure in the second direction is larger, the grating structure has easier processing, more freedom of adjustable parameters, and stronger efficiency adjustment ability, and is more conducive to improving the light efficiency of the waveguide. In some embodiment, the first distance P is smaller than a projection distance D of the second distance DO in a third direction d3 perpendicular to the first direction d1, and the third direction d3 is parallel to the plane where the grating structure 200 is located. By such setting, the grating structure may be equivalent to a one-dimensional grating with the grating vector in the vertical direction of the first direction, and since the projection distance D is larger, the grating structure has easier processing, more freedom of adjustable parameters, and stronger efficiency adjustment ability, and is more conducive to improving the light efficiency of the waveguide.

Since the period of one dimensional direction (such as the period in the first direction) of the grating structure of the present application is much smaller than that of the other dimension (such as the period in the vertical direction of the first direction in the plane where the grating structure is located, that is, the third direction d3), light has a diffraction order in the dimensional direction with a large period (that is, the grating vector direction of the grating structure, i.e., the third direction d3), and the diffraction order in the other direction (such as in the first direction) is an evanescent wave. Therefore, there is only a diffraction order in one dimensional direction, which is equivalent to a one-dimensional grating.

Continuing with reference to FIG. 2, x-axis direction is parallel to or coincident with the first direction d1. Y-axis direction is perpendicular to the x-axis direction. The third direction d3 is parallel to or coincident with the y-axis direction. The included angle between the third direction d3 and the second direction d2 is E. A is a wavelength of incident light. (θ,φ) are an incident angle and azimuth angle of light beam incident onto the grating structure 200 through total reflection in the waveguide. Then the light beam is diffracted and split through the grating structure 200. The order of diffraction splitting ($\theta_{mn}$, $\varphi_{mn}$) satisfies the following grating equation, where $n_l$ is a waveguide refractive index, and m, n are corresponding orders.

When P and D0 are close or equal, both m and n have non-zero orders. That is, the following grating equation has a solution for ($\theta_{mn}$, $\varphi_{mn}$) when m is non-zero. The light then has diffraction orders in two directions, thereby realizing the light splitting in these two directions. At this time, the grating structure is actually a two-dimensional grating structure.

In order to make the grating structure equivalent to the one-dimensional grating, in this application, the first distance P is smaller than the second distance D0, or the first distance P is smaller than the projection distance D. The projection distance D=D0 cos ε, and m has only zero order. That is, the following grating equation has no solution for $(\theta_{min}, \varphi_{mn})$ when m is non-zero.

Grating equation:

$$n_l \sin\theta_{mn}\cos\varphi_{mn} = n_l\sin\theta\cos\varphi + m\frac{\lambda}{P}$$

$$n_l\sin\theta_{mn}\sin(\varphi_{mn}+\varepsilon) = n_l\sin\theta\sin\varphi + n\frac{\lambda}{D_0}$$

Solve for $(\theta_{mn}, \varphi_{mn})$ $$\theta_{mn} = \arcsin\frac{1}{n_l}\sqrt{\left(n_l\sin\theta\cos\varphi + m\frac{\lambda}{P}\right)^2 + \left[(n_l\sin\theta\cos\varphi)\tan\varepsilon - \left(n_l\sin\theta\sin\varphi\sec\varepsilon + n\frac{\lambda}{D}\right)\right]^2}$$

$$\varphi_{mn} = \arctan\left[\sec\varepsilon\left(\frac{n_l\sin\theta\sin\varphi + n\frac{\lambda}{D_0}}{n_l\sin\theta\cos\varphi + m\frac{\lambda}{P}} - \sin\varepsilon\right)\right]$$

When m is non-zero, the grating equation has no solution for $(\theta_{mn}, \varphi_{mn})$, and when m is non-zero, the value in arcsin is greater than 1, and thus:

$$P < \frac{\lambda}{\max\left(|n_l\sin\theta\cos\varphi| + \sqrt{n_l^2 - \left[(n_l\sin\theta\cos\varphi)\tan\varepsilon - \left(n_l\sin\theta\sin\varphi\sec\varepsilon + n\frac{\lambda}{D}\right)\right]^2}\right)}$$

Wherein, E is an included angle between the third direction and the second direction, λ is a wavelength of incident light, (θ,φ) are an incidence angle and azimuth angle of light beam incident onto the grating structure through total reflection propagation in the waveguide substrate, $n_l$ is a waveguide refractive index, and D is the projection distance.

That is, when the first distance satisfies the above conditions, the grating structure has only a diffraction order in one dimensional diffraction, which is equivalent to a one-dimensional grating.

The value of the first distance P can be reasonably set on the premise of satisfying the above formula conditions, so as to avoid the occurrence of energy waste if the field energy utilization rate is less than 1. Since the value of P is also affected by conditions such as the refractive index of the waveguide and the wavelength of the incident light, it may be adjusted and changed accordingly when these conditions are different. For example, when the most common waveguide refractive index and wavelength are taken, the first distance is less than 0.5 times the projection distance, that is, P is less than 0.5 times D. The grating structure only has a diffraction order in one dimensional direction, which will not introduce other orders and will not cause energy waste, and may be equivalent to a one-dimensional grating.

Furthermore, when expanding the range of possible values for the waveguide refractive index and wavelength, the first distance is less than 0.4 times the projection distance, that is, P is less than 0.4 times D, which may satisfy the above formula conditions, such that other orders will not be introduced, exhibiting the same characteristics as the wire grating.

In some embodiments, the projection distance has a numerical range between 200 and 700 nm, or further between 200 and 300 nm, or between 300 and 500 nm, or other suitable numerical ranges.

In some embodiments, the periodic structure has a size greater than or equal to 70 nm in the first direction, or may also be in other suitable size ranges.

The periodic structure may be any suitable structure, for example, the periodic structure is a hole-like structure or a columnar structure. The shape of the periodic structure may be any suitable shape. For example, the cross-sectional shape of the periodic structure is one of the following shapes: circle, oval, and polygon. The cross-section can be a cross-section parallel to the surface where the grating structure is located. The cross-sectional shape may also refer to the projected shape of the periodic structure on the surface of the waveguide substrate.

The polygon may be a rectangle, a pentagon, a hexagon or other irregular or regular polygons. Wherein, in one embodiment, the polygon comprises a polygon with chamfers or a polygon without chamfers.

Figure 3A:
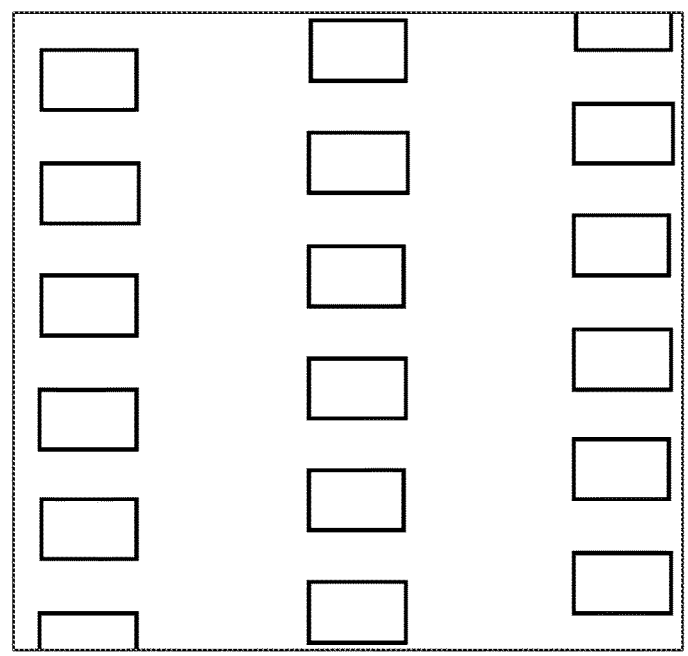
FIG. 3A shows a top view of a grating structure with periodic structures in a rectangular shape in one embodiment of the present application.

For example, as shown in FIG. 3A, the cross-sectional shape of the periodic structure is rectangular. P is 150 nm, D0 is 385 nm, and D is 380 nm. One set of opposite sides is parallel to the first direction and has a length of 75 nm, and the other set of opposite sides has a length of 125 nm.

Figure 3B:
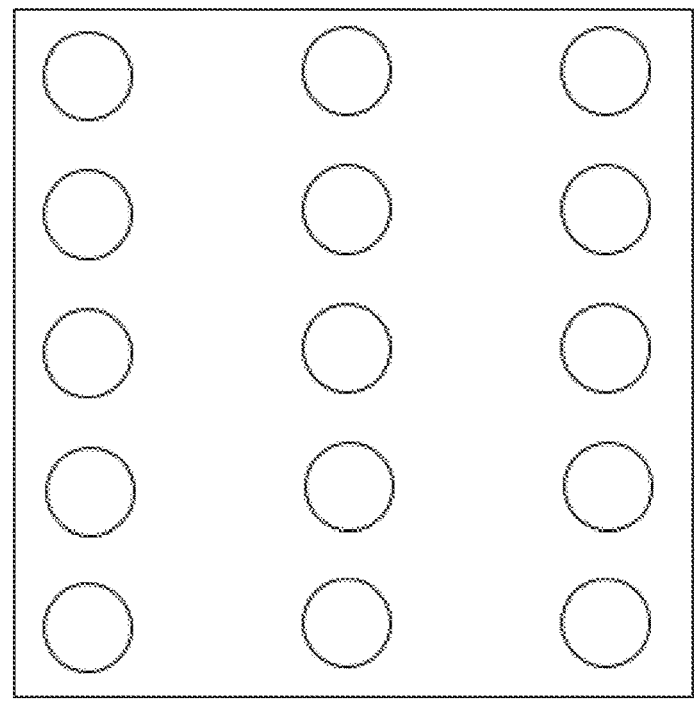
FIG. 3B shows a top view of a grating structure with periodic structures in a circular shape in one embodiment of the present application.

For another example, as shown in FIG. 3B, the cross-sectional shape of the periodic structure is circular. P is 150 nm, D0 is 380 nm, and D is 380 nm. The circle has a diameter of 100 nm.

Figure 3C:
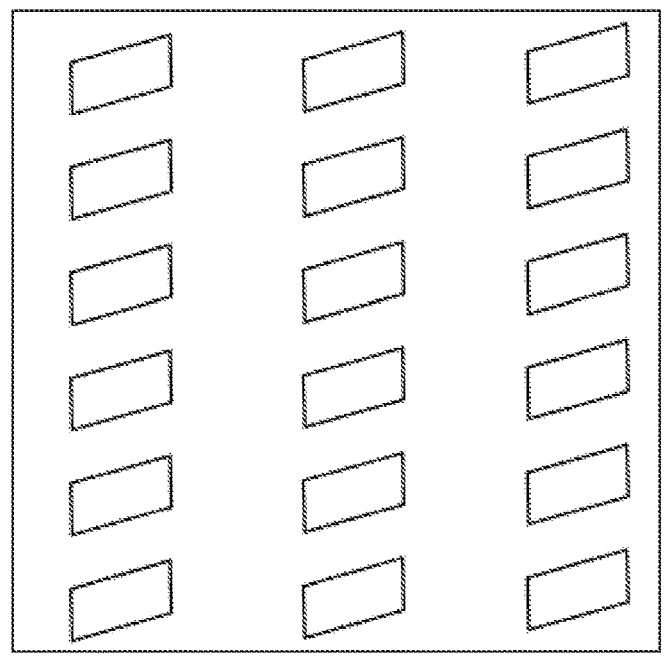
FIG. 3C shows a top view of a grating structure with periodic structures in a parallelogram shape in one embodiment of the present application.

For another example, as shown in FIG. 3C, the cross-sectional shape of the periodic structure is a parallelogram. P is 140 nm, D0 is 380 nm, and D is 380 nm. One set of opposite sides is parallel to the first direction and has a length of 70 nm, and the other set of opposite sides has a length of 140 nm. One corner of the parallelogram has an angle of 110°.

Figure 3D:
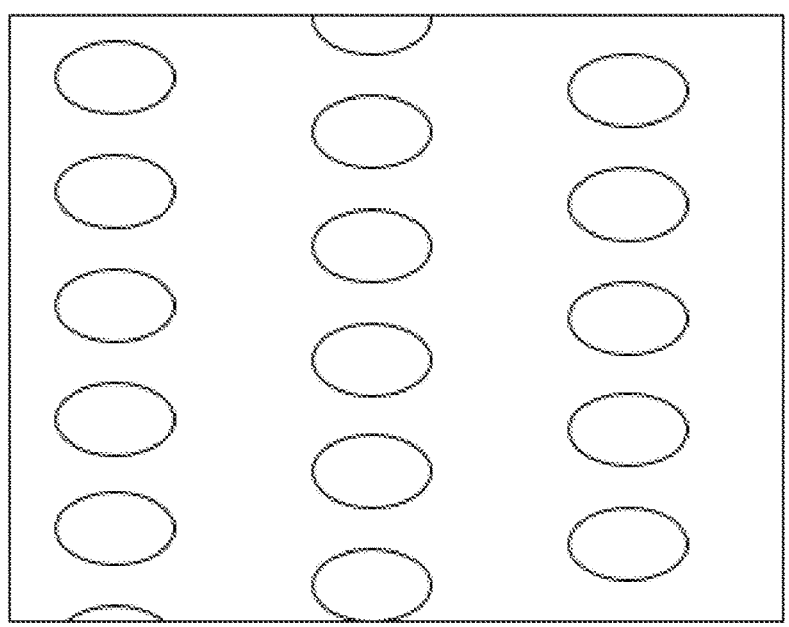
FIG. 3D shows a top view of a grating structure with periodic structures in an ellipse shape in one embodiment of the present application.

For another example, as shown in FIG. 3D, the cross-sectional shape of the periodic structure is a parallel ellipse. P is 150 nm, D0 is 407 nm, and D is 400 nm. The minor axis direction is parallel to the first direction, and the minor axis has a length of 100 nm. The major axis has a length of 200 nm.

Figure 3E:
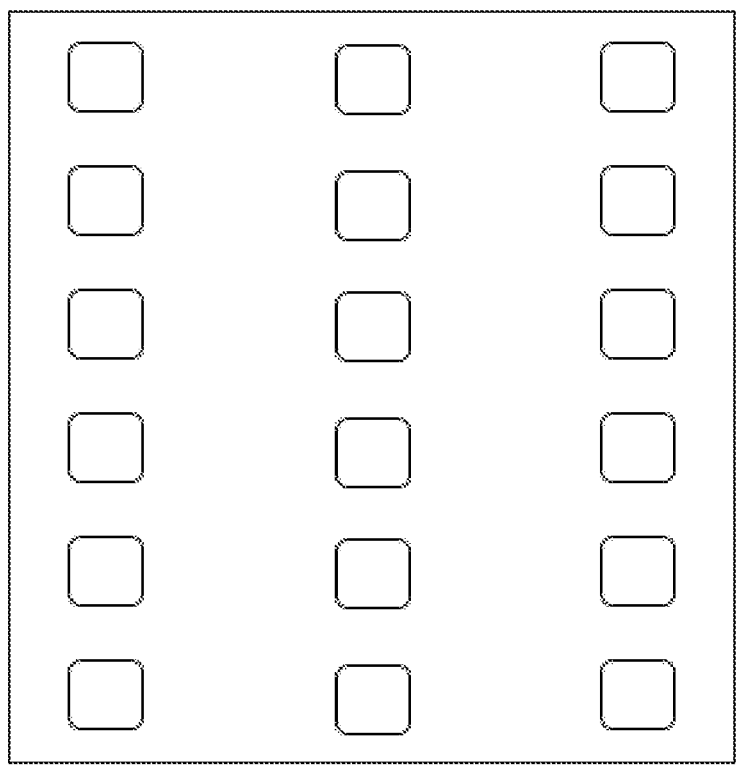
FIG. 3E shows a top view of a grating structure with periodic structures in a chamfered rectangle shape in one embodiment of the present application.

For another example, as shown in FIG. 3E, the cross-sectional shape of the periodic structure is a rectangle with chamfers, such as a square with chamfers. P is 150 nm, D0 is 400 nm, and D is 400 nm. One set of opposite sides is parallel to the first direction and has a length of 85 nm. The chamfer has a radius of 7 nm.

The above grating structure 200 may be applied to a part of the coupling-out region 114 as a coupling-out grating, or may also be applied to a part of the relay region as a relay grating.

An example of implementation when the equivalent one-dimensional grating structure of the present application is applied to the coupling-out region 114 will be described below with reference to FIG. 4.

Figure 4:
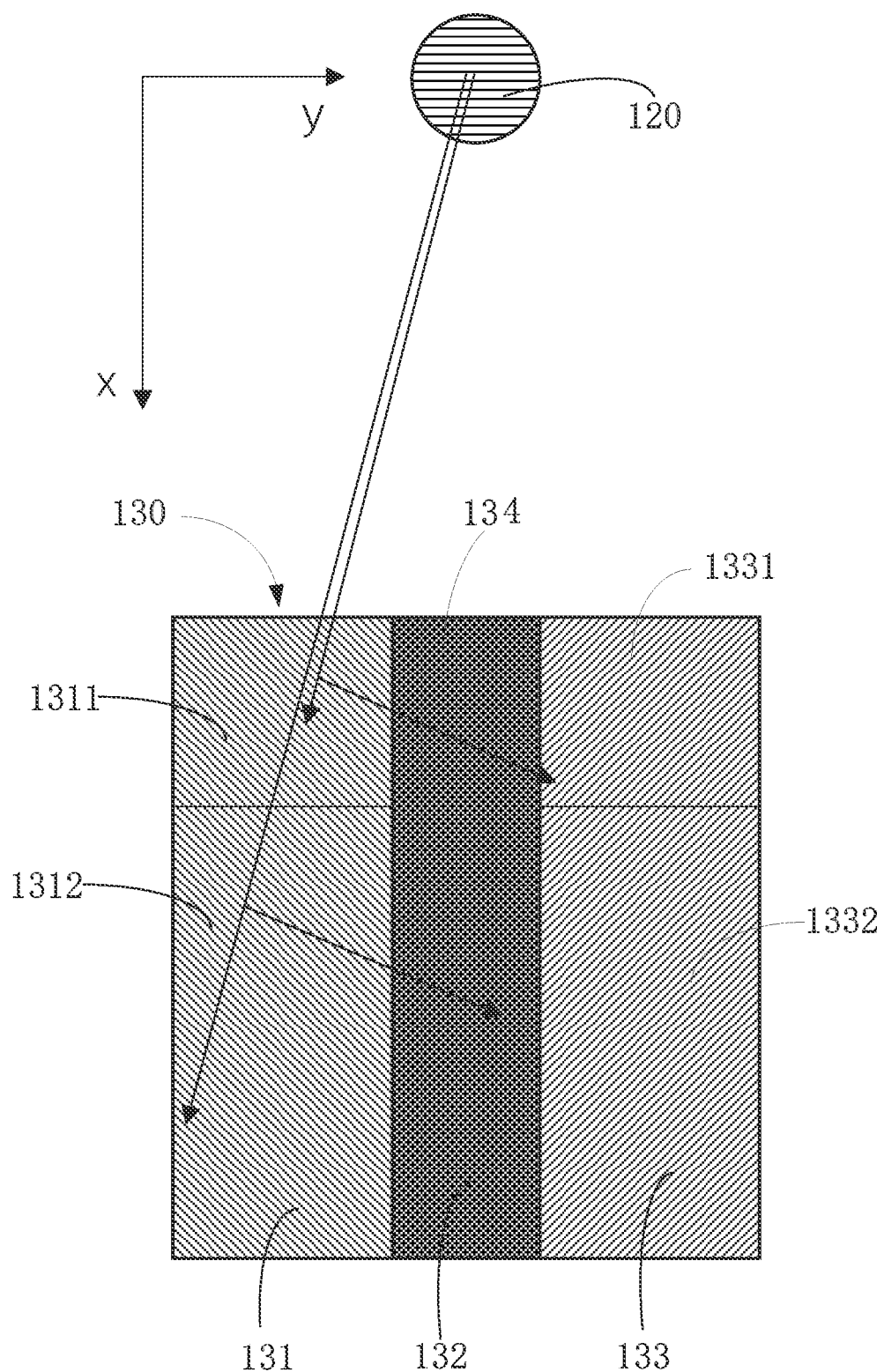
FIG. 4 shows a top view of a coupling-in grating and a coupling-out grating in one embodiment of the present application.
Figure 5:
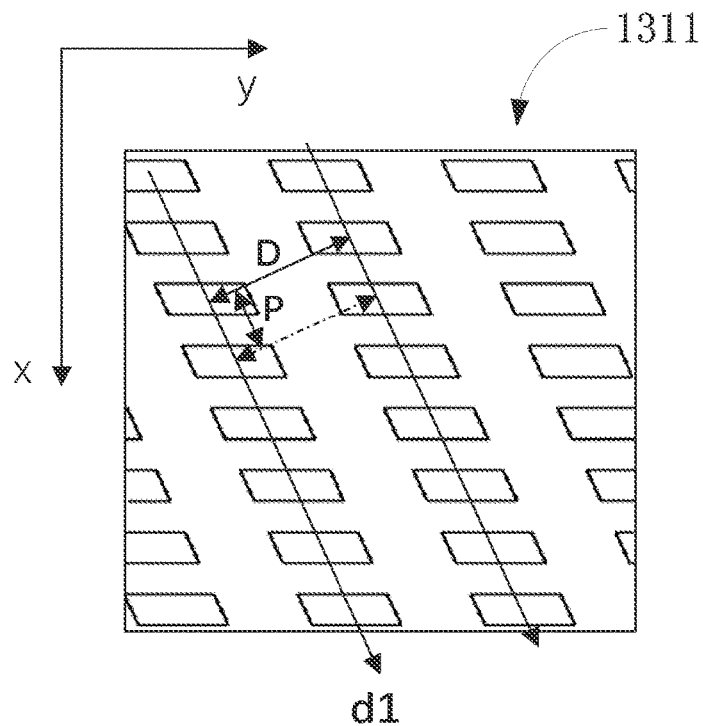
FIG. 5 shows a top view of a grating structure in the coupling-out grating in one embodiment of the present application.

As an example, referring to FIGS. 4 and 5, the coupling-out region 114 comprises a first coupling-out region 131, a second coupling-out region 132 and a third coupling-out region 133. The second coupling-out region 132 is located between the first coupling-out region 131 and the third coupling-out region 133. Optionally, the first coupling-out region 131 and the third coupling-out region 133 are symmetrical about a center line of the second coupling-out region 132. In some embodiments, the second coupling-out region 132 is opposite to the coupling-in grating 120.

The coupling-out grating 130 is disposed in the coupling-out region 114. The coupling-out grating 130 comprises the aforementioned grating structure 200 and a first coupling-out grating 134. The grating structure 200 is provided in at least a part region of at least one selected from the first coupling-out region 131 and the third coupling-out region 133. The grating structure 200 is close to the coupling-in grating 120. The first coupling-out grating 134 is disposed in the second coupling-out region 132. Wherein the first coupling-out grating 134 is a two-dimensional grating.

In some embodiments, when the grating structure 200 is provided in a part of the first coupling-out region 131 or the third coupling-out region 133, a one-dimensional grating may be provided in a region other than the grating structure 200 in the first coupling-out region 131, and a one-dimensional grating may be provided in a region other than the grating structure 200 in the third coupling-out region 133. The one-dimensional grating may be formed as a protrusion on the surface of the waveguide substrate 110, and the height of the protrusion may be reasonably set according to actual needs. The one-dimensional grating may be composed of a plurality of grating lines, each of which may be formed by a plurality of periodic structures connected continuously.

Continuing with reference to FIG. 4, exemplarily, the first coupling-out region 131 comprises a first sub-coupling-out region 1311 and a second sub-coupling-out region 1312. Wherein the first sub-coupling-out region 1311 is close to the coupling-in grating 120, and the second sub-coupling-out region 1312 is far away from the coupling-in grating 120. The grating structure 200 is located in the first sub-coupling-out region 1311, and the second sub-coupling-out region 1312 is provided with a one-dimensional grating.

Continuing with reference to FIG. 4, exemplarily, the third coupling-out region 133 comprises a third sub-coupling-out region 1331 and a fourth sub-coupling-out region 1332. Wherein the third sub-coupling-out region 1331 is close to the coupling-in grating 120, and the fourth sub-coupling-out region 1332 is far away from the coupling-in grating 120. The grating structure 200 is located in the third sub-coupling-out region 1331, and the fourth sub-coupling-out region 1332 is provided with a one-dimensional grating.

It is worth mentioning that the grating vector direction is parallel to the direction along which the grating structure periodically changes/is arranged (e.g., perpendicular to the direction of the one-dimensional grating marking/grooving, and for the grating structure 200 of the present application, perpendicular to the first direction in the plane in which the grating structure is located) and is consistent with the propagation direction of the positive first-order diffracted light of the grating.

Figure 6A:
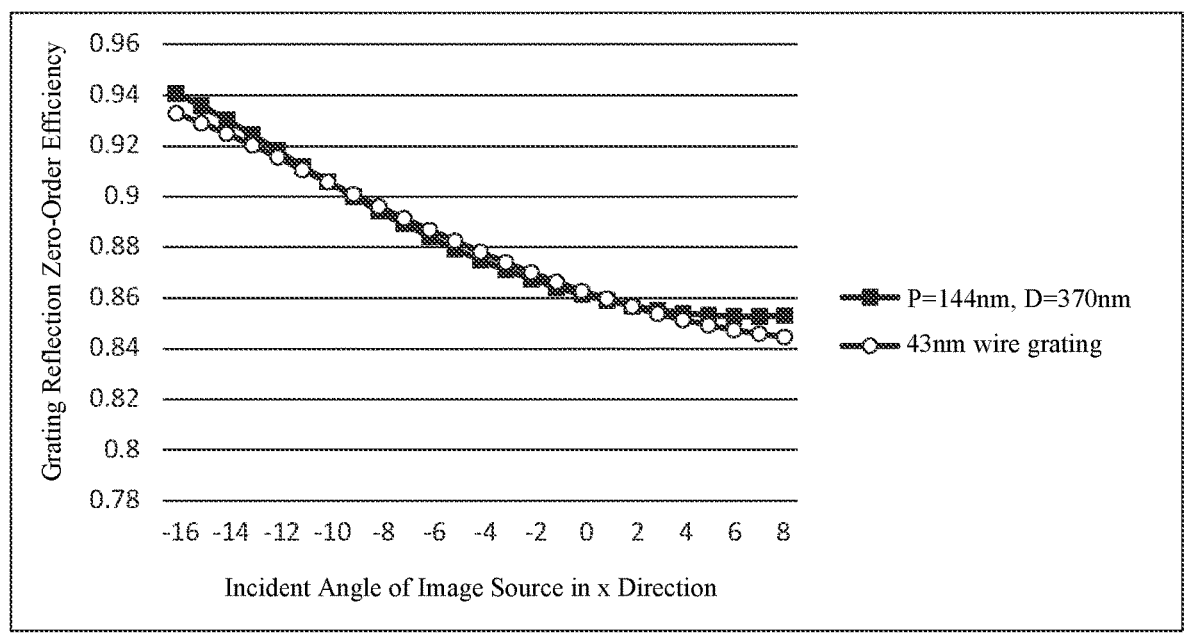
FIG. 6A shows a curve comparison diagram of grating reflection zero-order efficiency corresponding to the grating structure in one embodiment of the present application with grating reflection zero-order efficiency corresponding to a conventional wire grating.
Figure 6B:
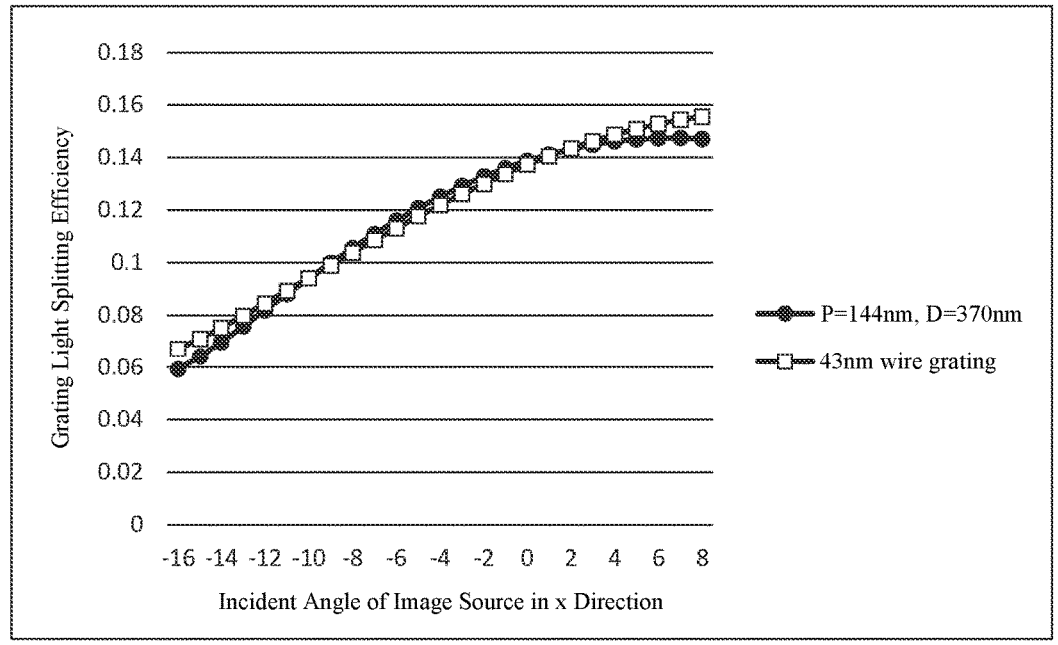
FIG. 6B shows a curve comparison diagram of grating light splitting efficiency corresponding to the grating structure in one embodiment of the present application with grating light splitting efficiency corresponding to a conventional wire grating.
Figure 6C:
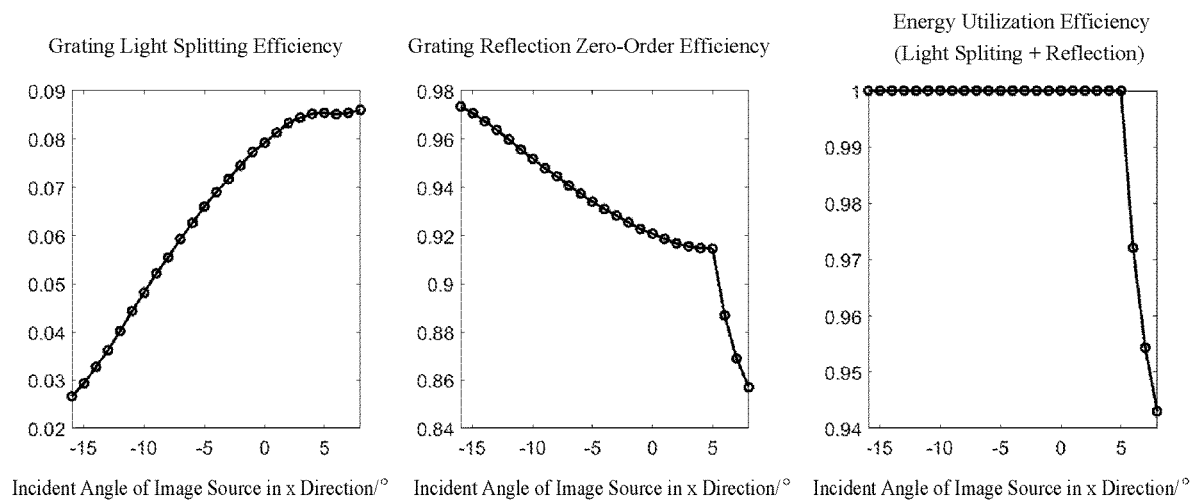
FIG. 6C shows curve graphs corresponding to the grating light splitting efficiency, grating reflection zero-order efficiency and energy utilization efficiency respectively when the first distance P does not meet the formula requirements in one embodiment of the present application.

In one specific embodiment, as shown in FIG. 5, the included angle between the first direction d1 and the x-axis may be 25°, wherein the x-axis is the grating vector direction of the coupling-in grating and is positive towards the coupling-out grating, and the y-axis is the direction perpendicular to the x-axis. The periodic structure of the grating structure in the first sub-coupling-out region 1311 is a parallelogram concave hole structure. As shown in FIG. 5, one set of opposite sides is parallel to the y-axis, and the length may be 190 nm. The other set of opposite sides is parallel to the first direction d1 and has a length of 72 nm. P is about 144 nm, and D and D0 are equal to 370 nm. The waveguide may be used for image coupling-in and coupling-out of monochromatic green light. The wavelength used in the embodiment can be 532 nm, and the image input angle is −16°~8° along the x axis direction and −9°~9° along the y axis direction. The light of the field of view at an angle of 3°~9° along the y-axis direction enters the waveguide by the coupling-in of the coupling-in grating 120 and propagates toward the coupling-out grating 130 through total reflection, and will propagate into the first sub-coupling-out region 1311. The light beam is diffracted and split through the grating structure in the first sub-coupling-out region 1311. Part of the light beam is split and propagated to the second coupling-out region 132 and the third coupling-out region 133, and is coupled outward of the waveguide into the human eye in the second coupling-out region 132 and the third coupling-out region 133. The other part of the light beam continues to be reflected and propagated in the original direction into the second sub-coupling-out region 1312. For the image field of view with 3°~9° along the y axis direction, the light of the image field of view close to 8° along the x axis direction is mainly split by the grating structure of the first sub-coupling-out region 1311 into the second coupling-out region 132 and the third coupling-out region 133, and then is coupled out into the human eye. For the image field of view with 3°~9° along the y axis direction, the light of the image field of view close to −16° along the x axis direction is mainly conducted to the second sub-coupling-out region 1312 by the grating structure of the first sub-coupling-out region 1311 and then is split into the second coupling-out region 132 and the third coupling-out region 133, and then is coupled-out into the human eye. The image field of view close to 8° along the x-axis direction is coupled out into the human eye mainly by the front end of the coupling-out grating, generally with relatively high coupling-out efficiency. While the image field of view close to −16° along the x-axis direction is coupled out into the human eye mainly by the front end of the coupling-out grating, with relatively low coupling-out efficiency. In order to improve the uniformity of coupling-out efficiency between 8° and −16°, a one-dimensional grating such as a narrow grooved wire grating may be disposed in the first sub-coupling-out region 1311, so that the light of the −16° field of view has high reflection zero-order efficiency in the first sub-coupling-out region 1311 as possible, making its energy conducted to the second sub-coupling-out region 1312 as much as possible. The narrow grooved wire grating has a groove width of 43 nm, a period of 370 nm, and a depth of 85 nm. The refractive index of the material is 1.92. As shown in the corresponding curve in FIG. 6A, from the variation curve of the grating reflection zero-order with the x-direction angle from −16° to 8° (the y-direction angle is fixed at 9°), it can be seen that the grating reflection zero-order efficiency close to −16° in the x direction is significantly higher than that of 8°, and most of the energy in the −16° field of view is conducted to the second sub-coupling-out region 1312. However, the minimum line width of the wire grating is only 43 nm, which has certain challenges for template processing and nanoimprint lithography. The aforementioned grating structure 200 in the present application is applied to the first sub-coupling-out region 1311, with a minimum line width of 72 nm, which increases by 67% and is easier to process. Moreover, the grating reflection zero-order efficiency from −16° to 8° in the x-direction angle is very close to that of the wire grating, and the grating reflection zero-order efficiency close to −16° is higher than that of the wire grating. Therefore, it has more advantages in design light efficiency and processing difficulty than the wire grating. FIG. 6B shows the light splitting efficiency. It can be seen that the sum of the light splitting efficiency of the structure and the grating reflection zero-order efficiency of the present application is 1. That is, the structure will not introduce other orders and there is no energy waste, which is consistent with the characteristics of the wire grating. However, when the first distance P becomes larger and does not meet the previous formula, the other orders will be introduced, resulting in energy waste. As shown in FIG. 6C, the corresponding grating structure has the included angle of 25° between the first direction and the x-axis. One set of opposite sides is parallel to the y-axis and has a length of 190 nm, and the other set of opposite sides is parallel to the first direction and has a length of 72 nm (for the width along the x direction, 43 nm is the minimum width). P is 159 nm, and D is 370 nm. That is, P is 0.43 D. The energy utilization rate of a part of the field of view is less than 1, and energy waste occurs.

Figure 6D:
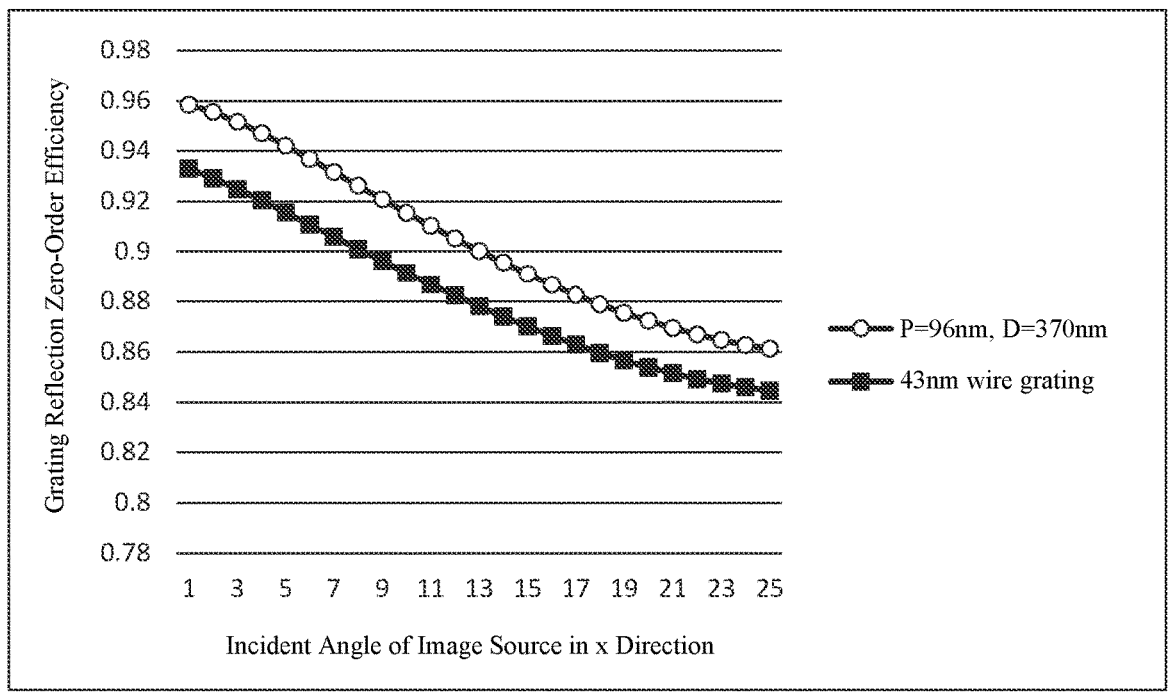
FIG. 6D shows a curve comparison diagram of the grating reflection zero-order efficiency corresponding to the grating structure in another embodiment of the present application with the grating reflection zero-order efficiency corresponding to the conventional wire grating.
Figure 6E:
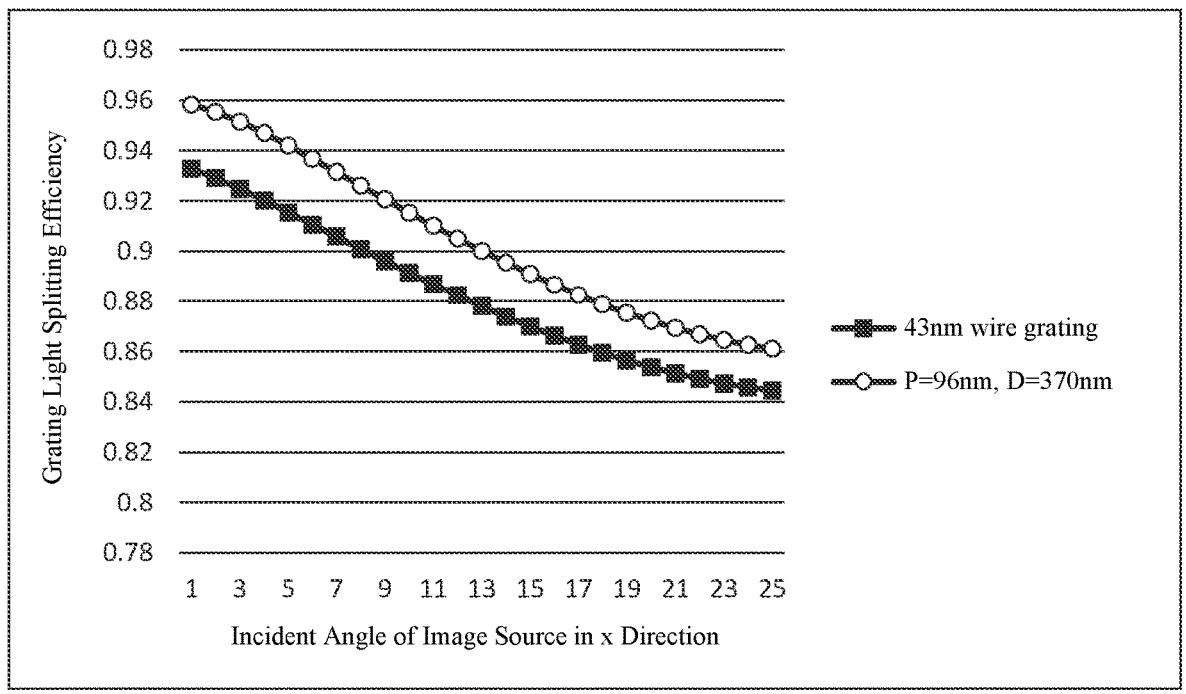
FIG. 6E shows a curve comparison diagram of the grating light splitting efficiency corresponding to the grating structure in another embodiment of the present application with the grating light splitting efficiency corresponding to the conventional wire grating.

Moreover, with the same minimum line width, the grating structure of the present application has a higher upper limit of reflection zero-order efficiency than that of the wire grating, and it has greater efficiency adjustment ability. The periodic structure of the grating structure is a parallelogram concave structure. The included angle between the first direction and the x axis is 25°. One set of opposite sides is parallel to the y axis and has a length of 150 nm. The other set of opposite sides is parallel to the first direction and has a length of 47 nm (for the width along the x direction, 43 nm is the minimum width). P is 96 nm, D is 370 nm. The reflection zero-order distribution thereof is shown in FIG. 6D. It can be seen that the grating structure of the present application has a higher upper limit of reflection zero-order efficiency and stronger adjustment ability, as well as a higher grating splitting efficiency, as shown in FIG. 6E.

Figure 7:
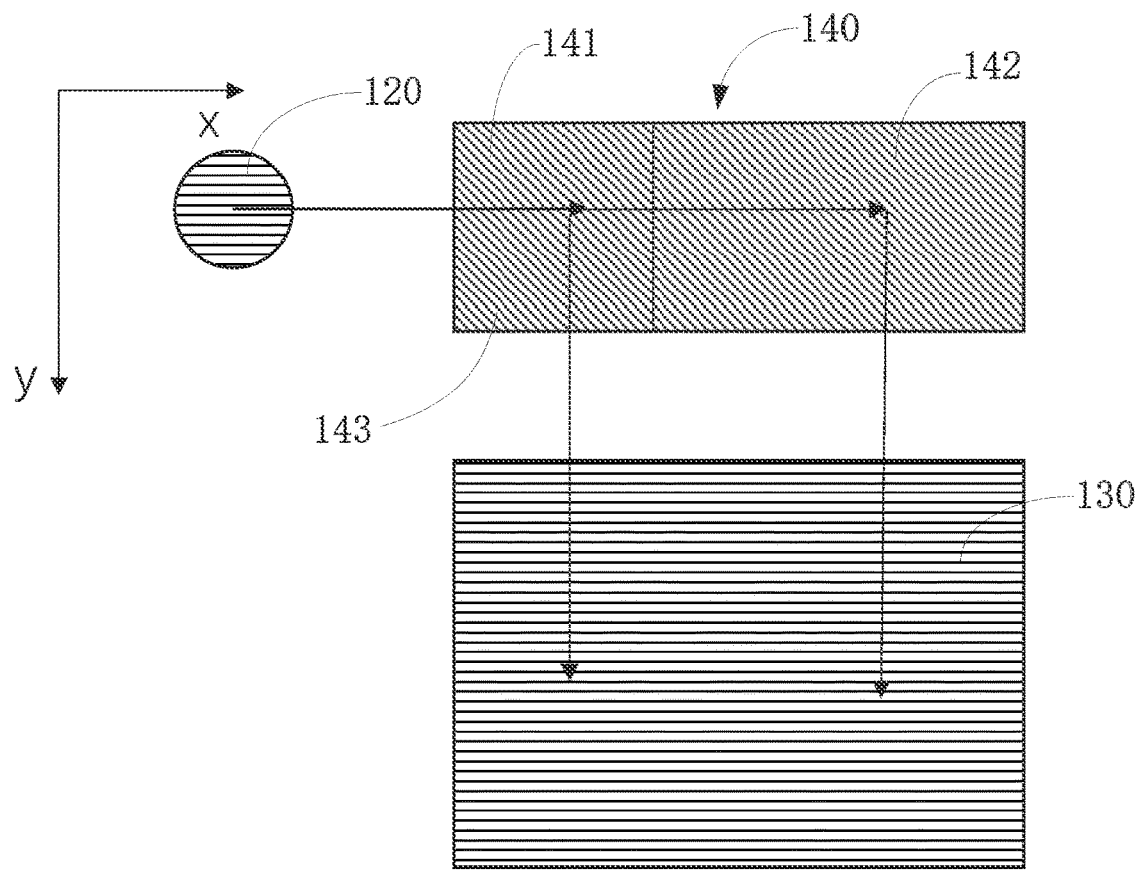
FIG. 7 shows a top view of the coupling-in grating, a relay grating and the coupling-out grating in one embodiment of the present application.

In other embodiments of the present application, as shown in FIG. 7, the diffractive optical waveguide 100 of the present application comprises a coupling-out region 114, a coupling-in region 113 and a relay region 140. The relay grating 143 is disposed on the surface of the waveguide substrate 110 or in the waveguide substrate and located in the relay region 140 for splitting at least a portion of input light propagating therein to the coupling-out grating by diffraction. Wherein the relay grating 143 comprises the aforementioned grating structure 200.

Exemplarily, the coupling-in grating 120 in the coupling-in region 113 is a one-dimensional grating. The relay grating 143 in the relay region is a one-dimensional grating. The coupling-out grating 130 in the coupling-out region 114 may be a one-dimensional grating. Optionally, the relay region 140 comprises a first sub-relay region 141 and a second sub-relay region 142. Wherein the aforementioned grating structure 200 can be disposed in the first sub-relay region 141 that is close to the coupling-in grating 120. The second sub-relay region 142 is provided with the one-dimensional grating. Since the first sub-relay region 141 has the aforementioned grating structure 200, it has more advantages in design light efficiency and processing difficulty than conventional one-dimensional wire grating.

The grating structure of the present application has a larger second distance in the second direction, so it is easier to process. Moreover, it has more freedom of adjustable parameters and stronger efficiency adjustment ability, and is more conducive to improving the light efficiency of the waveguide.

Figure 8:
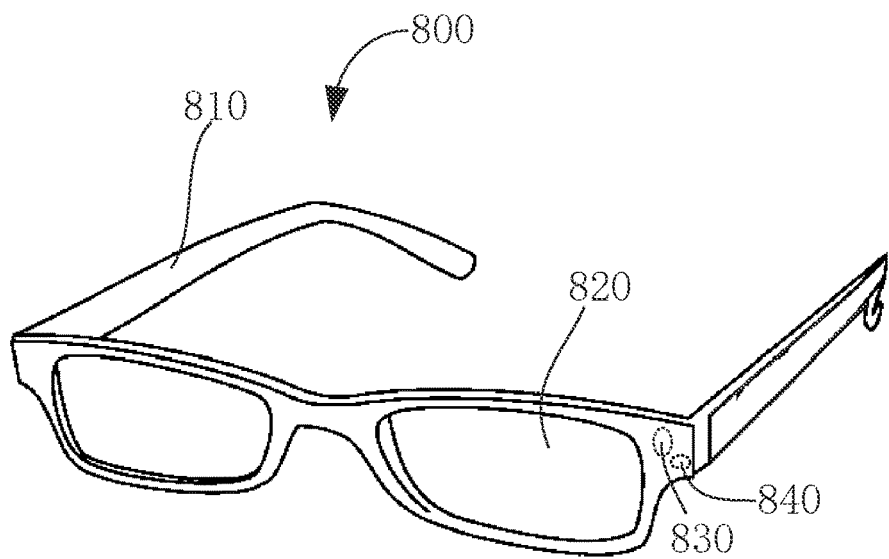
FIG. 8 shows a schematic diagram of a display device in one embodiment of the present application.

In another aspect, as shown in FIG. 8, the present application further provides a display device 800, which may comprise the aforementioned diffractive optical waveguide 100, wherein the description of the diffractive optical waveguide 100 may be referred to the above and will not be repeated here.

The display device 800 may be any device comprising the aforementioned diffractive optical waveguide 100. As shown in FIG. 8, for example, the display device 800 may be a near-eye display device, which may comprise: a lens 820 and a frame 810 for holding the lens near eyes. The lens 820 including the diffractive optical waveguide 100.

According to the display device of the present application, it makes human eyes feel a more moderate change in brightness of light in different incident directions and brighter light in the field of view when wearing an optical waveguide display device, without a significant change in the brightness of the image observed by the human eyes moving in the eyebox of the diffractive optical waveguide. This improves the display effect of the display device having the diffractive optical waveguide, and thereby improves the user's experience.

In some examples, as shown in FIG. 8, the display device may further comprise an optical machine 830. Optionally, the optical machine 830 can project image light onto the diffractive optical waveguide 100, e.g., into the area where the coupling-in grating 120 of the diffractive optical waveguide 100 is located. Wherein, the optical machine 830 may be micro displays, such as a laser beam scanning (LBS), a digital light procession (DLP), a digital micromirror device (DMD), a liquid crystal on silicon (LCOS), a micro electro mechanical system (MEMS), an organic light emitting diode (OLED), a Micro LED optical machine, or the like. The light emitted by the optical machine 830 is visible light.

Further, the display device may further comprise an actuating device 840 for actuating the optical machine 830 to project image light onto the coupling-in grating 120 of the diffractive optical waveguide 100. Wherein the actuating device 840 may comprise an actuating circuit, which may include a MOSFET, a capacitor, a resistor or other suitable components. The display device may further comprise a controller that may be electrically connectable to the actuating circuit. The actuating device 840 is controlled via the controller to actuate the optical machine 830 to project image light onto the coupling-in grating 120 of the diffractive optical waveguide.

Optionally, the area of the coupling-in region 113 may be greater than or equal to the area of the light speckle projected by the optical machine 830 onto the coupling-in region 113. Optionally, the optical axis of the image light projected by the optical machine 830 is perpendicular to the surface of the waveguide substrate 110 of the diffractive optical waveguide, so as to ensure the quality of the final image.

The light (e.g., image light) projected by the optical machine 830 onto the diffractive optical waveguide 100 is coupled-in to the waveguide substrate 110 via the coupling-in grating 120 and goes through total reflection and then coupled out. The light is coupled out through the coupling-out grating and enters the eyes of viewer wearing the near-eye device, thereby enabling the viewer to see the image projected by the optical machine 830.

In some embodiments, the display device is an augmented reality display device or a virtual reality display device, wherein the augmented reality display device includes but is not limited to the devices such as augmented reality (AR) glasses, an automotive head-up display (HUD), or the like.

It should be noted that the above-described embodiments are intended to illustrate but not limit the application, and alternative embodiments can be devised by those skilled in the art without departing from the scope of the appended claims. In the claims, any reference signs in parentheses shall not be construed as limiting the claim. The application can be implemented by means of hardware comprising several different elements as well as by means of a suitably programmed computer. In a unit claim listing several devices, some of these devices can be presented by the same one of hardware. The use of the words, such as first, second, and third, does not denote any order. These words can be interpreted as terms.

As discussed above with reference to the illustration of the figures, the followings are provided in this application:

(1) A diffractive optical waveguide for optical pupil expansion, comprising:
a waveguide substrate; and
a grating structure disposed on a surface of the waveguide substrate or in the waveguide substrate and comprising a plurality of periodic structures arranged at intervals along a first direction and arranged at intervals along a second direction,
wherein the second direction is different from the first direction; a first distance between the centers of adjacent periodic structures in the first direction is smaller than a second distance between the centers of adjacent periodic structures in the second direction; the grating structure is equivalent to a one-dimensional grating with a grating vector in a vertical direction of the first direction, and the vertical direction is parallel to a plane where the grating structure is located.

(2) The diffractive optical waveguide of item (1), wherein the first distance is smaller than a projection distance of the second distance in a third direction perpendicular to the first direction, and the third direction is parallel to the plane where the grating structure is located.

(3) The diffractive optical waveguide of item (2), wherein the first distance is P that satisfies the following relational expression:

$$P < \frac{\lambda}{\max\left(|n_I\sin\theta\cos\varphi| + \sqrt{n_I^2 - \left[(n_I\sin\theta\cos\varphi)\tan\varepsilon - \left(n_I\sin\theta\sin\varphi\sec\varepsilon + n\frac{\lambda}{D}\right)\right]^2}\right)}$$

wherein, ε is an included angle between the third direction and the second direction, λ is a wavelength of incident light, (θ,φ) are an incidence angle and azimuth angle of light beam incident onto the grating structure through total reflection propagation in the waveguide substrate, $n_I$ is a waveguide refractive index, and D is the projection distance.

(4) The diffractive optical waveguide of item (2), wherein the first distance is less than 0.5 times the projection distance.

(5) The diffractive optical waveguide of item (2), wherein the first distance is less than 0.4 times the projection distance.

(6) The diffractive optical waveguide of item (2), wherein the projection distance has a numerical range between 200 and 700 nm.

(7) The diffractive optical waveguide of item (1), wherein the periodic structure has a size greater than or equal to 70 nm in the first direction.

(8) The diffractive optical waveguide of item (1), wherein the periodic structure is a hole-like structure or a columnar structure.

(9) The diffractive optical waveguide of item (1), wherein a cross-sectional shape of the periodic structure is one of the following shapes: circle, oval, and polygon.

(10) The diffractive optical waveguide of item (9), wherein the polygon comprises a polygon with chamfers or a polygon without chamfers.

(11) The diffractive optical waveguide of item (1), wherein the waveguide substrate comprises a coupling-in region and a coupling-out region comprising a first coupling-out region, a second coupling-out region, and a third coupling-out region, the second coupling-out region being disposed between the first coupling-out region and the third coupling-out region, and the diffractive optical waveguide further comprises:
a coupling-in grating disposed on a surface of the waveguide substrate or in the waveguide substrate and located in the coupling-in region, and configured to couple input light into the waveguide substrate to cause it to propagate within the waveguide substrate through total reflection; and
a coupling-out grating disposed on a surface of the waveguide substrate or in the waveguide substrate and located in the coupling-out region for coupling at least a portion of input light propagating therein out of the waveguide substrate by diffraction, wherein the coupling-out grating comprises the grating structure provided in at least a part region of at least one selected from the first coupling-out region and the third coupling-out region and being close to the coupling-in grating, and a first coupling-out grating disposed in the second coupling-out region, wherein the first coupling-out grating is a two-dimensional grating.

(12) The diffractive optical waveguide of item (11), wherein the first coupling-out region comprises a first sub-coupling-out region and a second sub-coupling-out region, wherein the first sub-coupling-out region is close to the coupling-in grating; the second sub-coupling-out region is far away from the coupling-in grating; the grating structure is located in the first sub-coupling-out region; and the second sub-coupling-out region is provided with a one-dimensional grating.

(13) The diffractive optical waveguide of item (11), wherein the third coupling-out region comprises a third sub-coupling-out region and a fourth sub-coupling-out region, wherein the third sub-coupling-out region is close to the coupling-in grating; the fourth sub-coupling-out region is far away from the coupling-in grating; the grating structure is located in the third sub-coupling-out region; and the fourth sub-coupling-out region is provided with a one-dimensional grating.

(14) The diffractive optical waveguide of item (11), wherein the first coupling-out region and the third coupling-out region are symmetrical about a center line of the second coupling-out region.

(15) The diffractive optical waveguide of item (1), wherein the waveguide substrate comprises a coupling-in region, a relay region and a coupling-out region, a coupling-in grating disposed on a surface of the waveguide substrate or in the waveguide substrate and located in the coupling-in region, and configured to couple input light into the waveguide substrate to cause it to propagate within the waveguide substrate through total reflection;

a relay grating disposed on a surface of the waveguide substrate or in the waveguide substrate and located in the relay region for splitting at least a portion of input light propagating therein to the coupling-out grating by diffraction, wherein the relay grating comprises the grating structure;

a coupling-out grating disposed on a surface of the waveguide substrate or in the waveguide substrate and located in the coupling-out region for coupling-out at least a portion of input light propagating therein from the waveguide substrate by diffraction.

(16) The diffractive optical waveguide of item (15), wherein the relay region comprises a first sub-relay region and a second sub-relay region, wherein the grating structure is disposed in the first sub-relay region that is close to the coupling-in grating, and the second sub-relay region is provided with a one-dimensional grating.

(17) The diffractive optical waveguide of any one of items (1) to (16), wherein the grating structure has a diffraction order in a third direction perpendicular to the first direction, and the diffraction order in the first direction is an evanescent wave, wherein the third direction is parallel to the plane where the grating structure is located.

(18) A display device, comprising: the diffractive optical waveguide of any one of items (1) to (17), an optical machine and an actuating device configured to actuate the optical machine to project image light onto the coupling-in grating of the diffractive optical waveguide.

(19) The display device of item (18), wherein the optical machine is any one of the following optical machines: DLP optical machine, Mems optical machine or MicroLED optical machine.

(20) The display device of item (18), wherein the display device is a near-eye display device, comprising: a lens and a frame for holding the lens near eyes, the lens including the diffractive optical waveguide.

(21) The display device of any one of items (18) to (20), wherein the display device is an augmented reality display device or a virtual reality display device.

What is claimed is:

1. A diffractive optical waveguide for optical pupil expansion, comprising:

a waveguide substrate; and a grating structure disposed on a surface of the waveguide substrate or in the waveguide substrate and comprising a plurality of periodic structures arranged at intervals along a first direction and arranged at intervals along a second direction, wherein the second direction is different from the first direction; a first distance between the centers of adjacent periodic structures in the first direction is smaller than a second distance between the centers of adjacent periodic structures in the second direction; the first distance is smaller than a projection distance of the second distance in a third direction perpendicular to the first direction, and the third direction is parallel to a plane where the grating structure is located; the first distance is P that satisfies the following relational expression:

$$P < \frac{\lambda}{\max\left(|n_l\sin\theta\cos\varphi| + \sqrt{n_l^2 - \left[(n_l\sin\theta\cos\varphi)\tan\varepsilon - \left(n_l\sin\theta\sin\varphi\sec\varepsilon + n\frac{\lambda}{D}\right)\right]^2}\right)}$$

wherein, $\varepsilon$ is an included angle between the third direction and the second direction, $\lambda$ is a wavelength of incident light, $(\theta,\varphi)$ are an incidence angle and azimuth angle of light beam incident onto the grating structure through total reflection propagation in the waveguide substrate, $n_l$ is a waveguide refractive index, D is the projection distance, the grating structure is equivalent to a one-dimensional grating with a grating vector in a vertical direction of the first direction, and the vertical direction is parallel to the plane where the grating structure is located.

2. The diffractive optical waveguide of claim 1, wherein the first distance is less than 0.5 times the projection distance.

3. The diffractive optical waveguide of claim 1, wherein the first distance is less than 0.4 times the projection distance.

4. The diffractive optical waveguide of claim 1, wherein the projection distance has a numerical range between 200 and 700 nm.

5. The diffractive optical waveguide of claim 1, wherein the periodic structure has a size greater than or equal to 70 nm in the first direction.

6. The diffractive optical waveguide of claim 1, wherein the periodic structure is a hole-like structure or a columnar structure.

7. The diffractive optical waveguide of claim 1, wherein a cross-sectional shape of the periodic structure is one of the following shapes: circle, oval, and polygon.

8. The diffractive optical waveguide of claim 7, wherein the polygon comprises a polygon with chamfers or a polygon without chamfers.

9. The diffractive optical waveguide of claim 1, wherein the waveguide substrate comprises:
a coupling-in region; and
a coupling-out region comprising a first coupling-out region, a second coupling-out region, and a third coupling-out region, the second coupling-out region being disposed between the first coupling-out region and the third coupling-out region; and
the diffractive optical waveguide further comprises:
a coupling-in grating disposed on a surface of the waveguide substrate or in the waveguide substrate and located in the coupling-in region, and configured to couple input light into the waveguide substrate to cause it to propagate within the waveguide substrate through total reflection; and
a coupling-out grating disposed on a surface of the waveguide substrate or in the waveguide substrate and located in the coupling-out region for coupling at least a portion of input light propagating therein out of the waveguide substrate by diffraction, wherein the coupling-out grating comprises the grating structure provided in at least a part region of at least one selected from the first coupling-out region and the third coupling-out region and being close to the coupling-in grating, and a first coupling-out grating disposed in the second coupling-out region, wherein the first coupling-out grating is a two-dimensional grating.

10. The diffractive optical waveguide of claim 9, wherein the first coupling-out region comprises a first sub-coupling-out region and a second sub-coupling-out region, wherein
the first sub-coupling-out region is close to the coupling-in grating;
the second sub-coupling-out region is far away from the coupling-in grating;
the grating structure is located in the first sub-coupling-out region; and
the second sub-coupling-out region is provided with a one-dimensional grating.

11. The diffractive optical waveguide of claim 9, wherein the third coupling-out region comprises a third sub-coupling-out region and a fourth sub-coupling-out region, wherein
the third sub-coupling-out region is close to the coupling-in grating;
the fourth sub-coupling-out region is far away from the coupling-in grating;
the grating structure is located in the third sub-coupling-out region; and
the fourth sub-coupling-out region is provided with a one-dimensional grating.

12. The diffractive optical waveguide of claim 9, wherein the first coupling-out region and the third coupling-out region are symmetrical about a center line of the second coupling-out region.

13. The diffractive optical waveguide of claim 1, wherein the waveguide substrate comprises a coupling-in region, a relay region and a coupling-out region,
a coupling-in grating disposed on a surface of the waveguide substrate or in the waveguide substrate and located in the coupling-in region, and configured to couple input light into the waveguide substrate to cause it to propagate within the waveguide substrate through total reflection;
a relay grating disposed on a surface of the waveguide substrate or in the waveguide substrate and located in the relay region for splitting at least a portion of input light propagating therein to a coupling-out grating by diffraction, wherein the relay grating comprises the grating structure; and
the coupling-out grating disposed on a surface of the waveguide substrate or in the waveguide substrate and located in the coupling-out region for coupling at least a portion of input light propagating therein out of the waveguide substrate by diffraction.

14. The diffractive optical waveguide of claim 13, wherein the relay region comprises a first sub-relay region and a second sub-relay region, wherein the grating structure is disposed in the first sub-relay region that is close to the coupling-in grating, and the second sub-relay region is provided with a one-dimensional grating.

15. The diffractive optical waveguide of claim 1, wherein the grating structure has a diffraction order in a third direction perpendicular to the first direction, and the diffraction order in the first direction is an evanescent wave, wherein the third direction is parallel to the plane where the grating structure is located.

16. A display device, comprising:
the diffractive optical waveguide of claim 1, an optical machine and an actuating device configured to actuate the optical machine to project image light onto the coupling-in grating of the diffractive optical waveguide.

17. The display device of claim 16, wherein the optical machine is any one of the following optical machines: DLP optical machine, Mems optical machine or MicroLED optical machine.

18. The display device of claim 16, wherein the display device is a near-eye display device, comprising:
a lens and a frame for holding the lens near eyes, the lens including the diffractive optical waveguide.

19. The display device of claim 16, wherein the display device is an augmented reality display device or a virtual reality display device.

* * * * *